United States Patent
Usuki et al.

(10) Patent No.: US 11,186,657 B2
(45) Date of Patent: Nov. 30, 2021

(54) HYPERBRANCHED POLYMER, METAL RECOVERY AGENT, METAL RECOVERY METHOD, AND CATALYTIC ACTIVITY INHIBITOR

(71) Applicant: MAXELL HOLDINGS, LTD., Kyoto (JP)

(72) Inventors: Naoki Usuki, Mishima-gun (JP); Akiko Kito, Takatsuki (JP); Atsushi Yusa, Nagaokakyo (JP)

(73) Assignee: MAXELL, LTD., Kyoto (JP)

( * ) Notice: Subject to any disclaimer, the term of this patent is extended or adjusted under 35 U.S.C. 154(b) by 237 days.

(21) Appl. No.: 16/445,599

(22) Filed: Jun. 19, 2019

(65) Prior Publication Data
US 2019/0309104 A1    Oct. 10, 2019

Related U.S. Application Data

(63) Continuation of application No. PCT/JP2017/047054, filed on Dec. 27, 2017.

(30) Foreign Application Priority Data

Jan. 13, 2017  (JP) .............................. JP2017-004296

(51) Int. Cl.
  *C08F 12/30*  (2006.01)
  *C22B 11/00*  (2006.01)
  (Continued)

(52) U.S. Cl.
  CPC ............. *C08F 12/30* (2013.01); *B01J 20/261* (2013.01); *B01J 20/3214* (2013.01);
  (Continued)

(58) Field of Classification Search
  CPC ...... C08F 12/30; C01J 20/261; B01J 20/3214; B01J 20/3276; C23C 18/18
  See application file for complete search history.

(56) References Cited

U.S. PATENT DOCUMENTS

5,938,934 A * 8/1999 Balogh ............... C08L 101/005
                                                     210/688
2007/0298006 A1* 12/2007 Tomalia ............... A61K 9/0019
                                                     424/78.03
(Continued)

FOREIGN PATENT DOCUMENTS

JP    2014-043487 A    3/2014
JP    5499477 B2       5/2014
(Continued)

OTHER PUBLICATIONS

Mar. 27, 2018 International Search Report issued in International Patent Application No. PCT/JP2017/047054.
(Continued)

*Primary Examiner* — Melissa S Swain
(74) *Attorney, Agent, or Firm* — Oliff PLC

(57) ABSTRACT

There is provided a hyper-branched polymer represented by the following formula (1) and having a weight-average molecular weight in a range of 1,000 to 1,000,000. In the formula (1), $A^1$ is a group containing an aromatic ring, $A^2$ is a group containing an amide group, $A^3$ is a group containing sulfur, $R^0$ is hydrogen or a substituted or unsubstituted hydrocarbon group having 1 to 10 carbon atoms, m1 is in a range of 0.5 to 11, and n1 is in a range of 5 to 100.

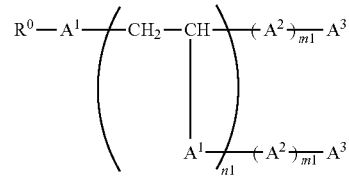

(1)

13 Claims, 2 Drawing Sheets

(51) Int. Cl.
  *B01J 20/26* (2006.01)
  *B01J 20/32* (2006.01)
  *C23C 18/18* (2006.01)
  *C08F 212/36* (2006.01)
  *C08F 220/56* (2006.01)
  *C08F 8/30* (2006.01)
  *C08F 293/00* (2006.01)

(52) U.S. Cl.
  CPC .......... *B01J 20/3276* (2013.01); *C08F 8/30* (2013.01); *C08F 212/36* (2013.01); *C08F 220/56* (2013.01); *C08F 293/00* (2013.01); *C22B 11/00* (2013.01); *C22B 11/04* (2013.01); *C23C 18/18* (2013.01)

(56) References Cited

U.S. PATENT DOCUMENTS

| | | |
|---|---|---|
| 2010/0048845 A1 | 2/2010 | Yasui et al. |
| 2010/0144957 A1* | 6/2010 | Yasui ............... C08F 228/02 524/547 |
| 2010/0240792 A1* | 9/2010 | Ishizu ............... C08F 212/30 522/174 |
| 2010/0249350 A1* | 9/2010 | Koga ............... C08G 83/005 526/288 |
| 2010/0286323 A1* | 11/2010 | Yasui ............... B22F 1/0062 524/440 |

FOREIGN PATENT DOCUMENTS

| | | |
|---|---|---|
| JP | 5534244 B2 | 6/2014 |
| JP | 5748076 B2 | 7/2015 |
| JP | 2015-221917 A | 12/2015 |
| JP | 2017-160518 A | 9/2017 |
| JP | 2017-199803 A | 11/2017 |
| JP | 2017-226890 A | 12/2017 |
| WO | 2012/070681 A1 | 5/2012 |

OTHER PUBLICATIONS

Mar. 27, 2018 Written Opinion issued in International Patent Application No. PCT/JP2017/047054.
Jul. 20, 2021 Notice of Reasons for Refusal issued in Japanese Patent Application No. 2018-561316.

* cited by examiner

HYPERBRANCHED POLYMER, METAL RECOVERY AGENT, METAL RECOVERY METHOD, AND CATALYTIC ACTIVITY INHIBITOR

CROSS REFERENCE TO RELATED APPLICATION

This application is a Continuation Application of International Application No. PCT/JP2017/047054 which was filed on Dec. 27, 2017 claiming the conventional priority of Japanese patent Application No. 2017-004296 filed on Jan. 13, 2017.

BACKGROUND OF THE INVENTION

Field of the Invention

The present invention relates to a novel hyper-branched polymer, and further relates to a metal recovery agent, a metal recovering method and a catalytic activity inhibitor using the hyper-branched polymer.

Description of the Related Art

The hyper-branched polymer is classified as a dendritic polymer, together with a dendrimer. The dendritic polymer is constructed of a molecular structure that frequently repeats regular branching. The dendrimer is a spherical polymer having a diameter of several nanometers, and has a dendritic branched structure that is branched regularly and completely with a molecule, which is a nucleus, as the center thereof. The hyper-branched polymer has an uncomplete dendritic branched structure, and is different from the dendrimer having the complete dendritic branched structure. Among the dendritic polymers, the hyper-branched polymer is inexpensive and relatively easy to be synthesized or composed. The hyper-branched polymer is thus advantageous in the industrial production. As the hyper-branched polymer and a production method thereof, there are known, for example, hyper-branched polymers having the structures and methods for producing the same as disclosed, for example, in Japanese Patents No. 5499477 and No. 5748076 which correspond to US2010-048845; and Japanese Patent No. 5534244.

The hyper-branched polymer has a large number of end groups (terminal groups) due to the special branched structure, and is expected to exhibit a variety of kinds of properties depending on the kind of the terminal groups. The present teaching provides a novel hyper-branched polymer which has a high metal-trapping capacity or performance and which is usable as a metal recovery agent, a catalytic activity inhibitor, etc.

SUMMARY OF THE INVENTION

According to a first aspect of the present teaching, there is provided a hyper-branched polymer represented by the following formula (1) and having a weight-average molecular weight in a range of 1,000 to 1,000,000:

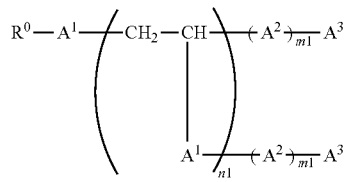

wherein in the formula (1), $A^1$ is a group containing an aromatic ring, $A^2$ is a group containing an amide group, $A^3$ is a group containing sulfur, $R^0$ is hydrogen or a substituted or unsubstituted hydrocarbon group having 1 to 10 carbon atoms, m1 is in a range of 0.5 to 11, and n1 is in a range of 5 to 100.

In the formula (1), $A^1$ may be a group represented by the following formula (2), and $A^3$ may be a dithiocarbamate group. Further, in the formula (1), $A^2$ may be a group represented by the following formula (3):

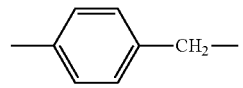

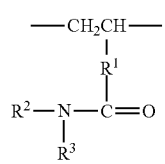

in the formula (3), $R^1$ is a single bond or a substituted or unsubstituted alkylene group having 1 to 5 carbon atoms, and $R^2$ and $R^3$ are each hydrogen or a substituted or unsubstituted alkyl group having 1 to 10 carbon atoms.

In the formula (3), $R^1$ may be the single bond, $R^2$ may be the hydrogen, and $R^3$ may be an isopropyl group.

In the formula (1), $A^3$ may be a group represented by the following formula (4):

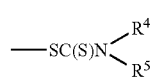

in the formula (4), $R^4$ and $R^5$ are each hydrogen or a substituted or unsubstituted alkyl group having 1 to 5 carbon atoms.

In the formula (4), $R^4$ and $R^5$ may be each an ethyl group.

In the formula (1), a ratio of a total molar number of the amide group contained in $A^2$ to a molar number of $A^3$ which is the group containing sulfur may be in a range of not less than 0.5 to less than 1.5. Further, in the formula (1), $A^3$ may be a dithiocarbamate group; and a ratio of a total molar number of the amide group contained in $A^2$ to a molar number of $A^3$ which is the group containing sulfur may be in a range of 0.5 to 1.5.

In the formula (1), $R^0$ may be a vinyl group. Further, the hyper-branched polymer may be a mixture of a hyper-branched polymer in which the $R^0$ in the formula (1) is a vinyl group and a hyper-branched polymer in which the $R^0$ in the formula (1) is an ethyl group.

According to a second aspect of the present teaching, there is provided a metal recovery agent recovering a metal in a liquid in which the metal is dissolved, including the hyper-branched polymer of the first aspect.

According to a third aspect of the present teaching, there is provided a metal-recovering method of recovering a metal in a liquid in which the metal is dissolved, the method including:

preparing a solution of a hyper-branched polymer by dissolving the hyper-branched polymer of the first aspect in a solvent;

applying the solution of the hyper-branched polymer onto a substrate so as to form a hyper-branched polymer layer; and causing the liquid to make contact with the hyper-branched polymer layer to thereby make the metal in the liquid to adsorb to the hyper-branched polymer layer and to recover the metal.

According to a fourth aspect of the present teaching, there is provided a catalytic activity inhibitor inhibiting catalytic activity of an electroless plating catalyst, the catalytic activity inhibitor including the hyper-branched polymer of the first aspect.

DESCRIPTION OF THE PREFERRED EMBODIMENT

A hyper-branched polymer of an embodiment of the present application is represented by the following formula (1):

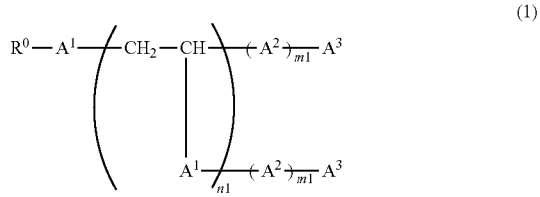

(1)

wherein in the formula (1), $A^1$ is a group containing an aromatic ring, $A^2$ is a group containing an amide group, $A^3$ is a group containing sulfur, $R^0$ is hydrogen or a substituted or unsubstituted hydrocarbon group having 1 to 10 carbon atoms, m1 is in a range of 0.5 to 11, and n1 is in a range of 5 to 100.

Although it is allowable to use, as $A^1$, any group under a condition that the group contains an aromatic ring, it is preferred that $A^1$ is, for example, a group represented by the following formula (2).

(2)

In a case that $A^1$ is the group represented by the formula (2), the hyper-branched structure of the hyper-branched polymer of the present embodiment has a styrene skeleton. In a case that the hyper-branched structure includes the styrene skeleton, the weather resistance and the heat resistance of the hyper-branched polymer are expected to be enhanced.

The hyper-branched polymer of the present embodiment has a plurality of terminal groups. In each of the terminal groups of the hyper-branched polymer represented by the formula (1), $A^2$ is the group containing an amide group, and $A^3$ is the group containing sulfur. Further, m1 is an average value of a number (repeating number) "m" of the group containing the amide group ($A^2$) in each of the terminal groups. Accordingly, it is allowable that m1 is not an integer. It is allowable that the hyper-branched polymer of the present embodiment has m1, which is the average number, in a range of 0.5 to 11, and that the hyper-branched polymer has a terminal group which does not have the group ($A^2$) containing the amide group (m=0).

Figure 1:
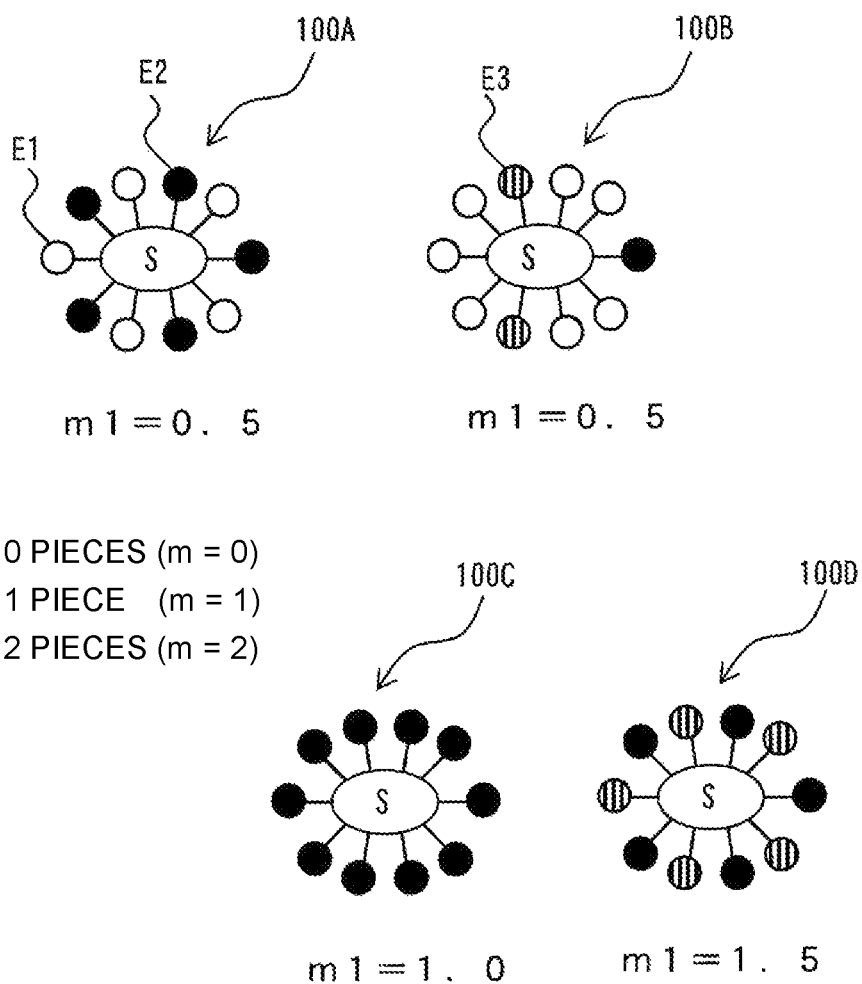
FIG. 1 is a schematic view of a hyper-branched polymer according to an embodiment.

In the following, a further explanation will be given about "m1" in the above-described formula (1) and about the repeating number "m" of the group ($A^2$) containing the amide group in each of the terminal groups. Hyper-branched polymers 100A to 100D schematically depicted in FIG. 1 are each an example of a hyper-branched polymer having a central portion S and 10 pieces of terminal group, wherein the central portion S is different from the terminal groups. A terminal group E1 indicated by a white circle (open circle) does not have the group ($A^2$) containing the amide group (m=0), a terminal group E2 indicated by a black (solid) circle has one piece of the group ($A^2$) containing the amide group (m=1), and a terminal group E3 indicated by vertical shaded lines has two pieces of the group ($A^2$) containing the amide group (m=2). It is allowable that, as in the hyper-branched polymers 100A and 100B, the terminal group E1 which does not have the group ($A^2$) containing the amide group is present. Further, it is allowable, as in the hyper-branched polymer 100C, the number of the group ($A^2$) containing the amide group is same in all the terminal groups; it is allowable, as in the hyper-branched polymers 100A, 100B and 100D, the number of the group ($A^2$) containing the amide group in each of the terminal groups is not the same among the terminal groups. The number (repeating number) "m" of the group ($A^2$) containing the amide group in each of the terminal groups is, for example, in a range of 0 (zero) to 11. The "m1" in the formula (1) is a quotient obtained by dividing the total number (total of the "m" in the molecule) of the group ($A^2$) containing the amide group inside the molecule by the number of the terminal groups. In each of the hyper-branched polymers 100A and 100B, m1 is 0.5; in the hyper-branched polymer 100C, m1 is 1.0; and in the hyper-branched polymer 100D, m1 is 1.5. The value of "m1" can be quantitively determined by a method such as the NMR method, the element analyzing method, etc.

The hyper-branched polymer of the present embodiment is expected to exhibit a variety of functions, owing to the plurality of terminal groups possessed by the hyper-branched polymer. For example, the terminal groups of the hyper-branched polymer represented by the formula (1) have (include) the groups containing the amide group and the sulfur, the terminal groups interact with a metal ion. The hyper-branched polymer of the present embodiment having the plurality of pieces of such terminal group functions as a polydentate ligand of the metallic ion, and thus forming a chelate bond with the metallic ion. With this, the hyperbranched polymer of the present embodiment is capable of adsorbing (trapping) the metal. By applying this function, the hyper-branched polymer of the present embodiment is usable, for example, as a metal recovery agent, and as a catalytic activity inhibitor inhibiting the catalytic activity of an electroless plating catalyst.

In the formula (1), $A^2$ is not particularly limited, under a condition that $A^2$ is the group containing the amide group. Further, the amide group contained in $A^2$ may be any one of a primary amide group, a secondary amino group, and a tertiary amide group. Furthermore, $A^2$ may be a group containing one piece of the amide group, or may be a group containing two or more pieces of the amide group. It is preferred that $A^2$ is a group represented by the following formula (3). In a case that $A^2$ is the group represented by the formula (3), the hyper-branched polymer of the present embodiment has, for example, an improved metal-trapping performance.

(3)

In the formula (3), $R^1$ is a single bond or a substituted or unsubstituted alkylene group having 1 to 5 carbon atoms, $R^2$ and $R^3$ are each hydrogen or a substituted or unsubstituted alkyl group having 1 to 10 carbon atoms. Further, in the formula (3), it is preferred that $R^1$ is the single bond, that $R^2$ is hydrogen, and that $R^3$ is an isopropyl group.

In the formula (1), $A^3$ is not particularly limited, under a condition that $A^3$ is the group containing sulfur; $A^3$ may be, for example, a dithiocarbamate group, a trithiocarbonate group, a sulfide group, a thiocyan group, etc. Among these substances, it is preferred that $A^3$ is the dithiocarbamate group. In a case that $A^3$ is the dithiocarbamate group, the hyper-branched polymer of the present embodiment can be easily synthetized, and has an improved metal-trapping performance. Further, it is preferred that $A^3$ is a group represented by the following formula (4).

(4)

In the formula (4), $R^4$ and $R^5$ are each hydrogen or a substituted or unsubstituted alkyl group having 1 to 5 carbon atoms. Further, in the formula (4), it is preferred that $R^4$ and $R^5$ are each an ethyl group.

By changing the number of the amide group contained in the terminal group, the hyper-branched polymer of the present embodiment is expected to exhibit a variety of kinds of function. The number of the amide group contained in the terminal group can be expressed as a molar ratio (hereinafter described as a "molar ratio (N/S)" as appropriate) of the amide group contained in $A^2$ to $A^3$ which is the group containing the sulfur, in the hyper-branched polymer represented by the formula (1). Namely, the molar ratio (N/S) is a ratio of the total molar number (total number) of the amide group contained in $A^2$ to the molar number (number) of $A^3$ which is the group containing sulfur. Note that in the formula (1), in a case that the number of the amide group contained in one unit of $A^2$ is 1 piece, the molar ratio (N/S) is substantially equal to the value of "m1". Further, the molar ratio (N/S) can be converted from the ratio of the area intensity of proton of the amide group contained in $A^2$ to that of $A^3$ which is the group containing the sulfur, in the $^1$H-NMR spectrum (result of analysis of $^1$H-Nuclear Magnetic Resonance Measurement) of the hyper-branched polymer.

In the hyper-branched polymer of the present embodiment, the molar ratio (N/S) may be in a range of 0.5 to 11. In a case that the molar ratio (N/S) is within the above-described range, the hyper-branched polymer represented by the formula (1) can be dissolved in a general-purpose solvent such as tetrahydrofuran (THF), methylethylketone (MEK), etc. Further, by changing the molar ratio (N/S) as appropriate, it is possible, for example, to control the dissolvability (solubility) with respect to a lower alcohol having 5 or less of carbon atoms.

The molar ratio (N/S) may be in a range of not less than 0.5 to less than 1.5. In a case that the molar ratio (N/S) is within the above-described range, the hyper-branched polymer represented by the formula (1) has improved solubility in a solvent with a relatively low polarity, such as cyclohexanone, toluene, etc. Although the reason for this is not clear, it is presumed as follows: namely, by making the number of the amide group contained in the terminal group to be less than 1.5 pieces, the polarity of the hyper-branched polymer is lowered.

In some cases, the hyper-branched polymer is used in such an aspect wherein, at first, a solution of the hyper-branched polymer (hyper-branched polymer solution) is prepared, and then the hyper-branched polymer solution is applied (coated) onto a substrate so as to form a layer of the hyper-branched polymer (hyper-branched polymer layer), thereby allowing the hyper-branched polymer is used in a form of the hyper-branched polymer layer. The hyper-branched polymer solution has a low viscosity even in a high concentration. Accordingly, even in a case that the hyper-branched polymer solution is applied to a substrate having a complex form or shape, it is possible to form a coating layer (hyper-branched polymer layer) of a uniform thickness. Further, even in a case that the hyper-branched polymer layer is formed as a thin film, the hyper-branched polymer layer contains a large number of the terminal group, and thus is capable of exhibiting the performance or property thereof sufficiently. The solvent of the hyper-branched polymer solution needs to be appropriately selected, depending on the kind of the substrate.

In the hyper-branched polymer of the present embodiment, the molar ratio (N/S) may be in a range of 0.5 to 3.5, preferably in a range of 0.5 to 2.5. In a case that the molar ratio (N/S) is within the above-described range, the hyper-branched polymer represented by the formula (1) has improved metal-trapping performance. Although the reason for this is not clear, it is presumed as follows: namely, in a case that the molar ratio (N/S) is smaller than this range, the number of the amide group which interact with the metal at the terminal group of the hyper-branched polymer represented by the formula (1) is not sufficient; whereas in a case that the molar ratio (N/S) is greater than this range, the terminal group becomes long and the number of the amide group which interact with the metal becomes excessive, which in turn causes a steric distortion in the chelate structure formed by the terminal group and the metal, resulting in destabilizing the chelate bond.

Further, in the hyper-branched polymer, of the present embodiment, which is represented by the formula (1), it is preferred that $A^3$ is a dithiocarbamate group and that the molar ratio (N/S) is in a range of 0.5 to 1.5. In a case that $A^3$ is made to be a dithiocarbamate group, it is possible to efficiently synthetize a hyper-branched polymer represented by the formula (1) and having such a structure that a terminal group is relatively short and the molar ratio (N/S) is relatively small. A hyper-branched polymer in which $A^3$ in the formula (1) is the dithiocarbamate group and the molar ratio (N/S) is within the range of 0.5 to 1.5 has high metal-trapping performance.

In the formula (1), it is allowable to use any hydrocarbon group, under a condition that $R^0$ in the formula (1) is hydrogen or a substituted or unsubstituted hydrocarbon group having 1 to 10 carbon atoms. The above-described hydrocarbon group may be a chain or cyclic saturated aliphatic hydrocarbon group, a chain or cyclic unsaturated aliphatic hydrocarbon group or an aromatic hydrocarbon group. A substituted group in a case that $R^0$ is a substituted hydrocarbon group may be, for example, an alkyl group, cycloalkyl group, vinyl group, allyl group, aryl group, alkoxy group, halogen group, hydroxy group, amino group, imino group, nitro group, silyl group or ester group, etc. Further, $R^0$ may be an unsubstituted hydrocarbon group, and may be, for example, a vinyl group or ethyl group.

The hyper-branched polymer of the present embodiment may be a mixture of hyper-branched polymers which are mutually different in view of $R^0$ in the formula (1). For example, in a case that $R^0$ has an unsaturated bond, there is such a case that in a synthesis process of the hyper-branched polymer, any addition reaction occurs in a part of the unsaturated bond, resulting in a saturated bond. In such a case, there is obtained a mixture of a hyper-branched polymer wherein $R^0$ in the formula (1) is an unsaturated hydrocarbon group and a hyper-branched polymer wherein $R^0$ in the formula (1) is a saturated hydrocarbon group. The hyper-branched polymer of the present embodiment may be a mixture of a hyper-branched polymer wherein $R^0$ in the formula (1) is a vinyl group and a hyper-branched polymer wherein $R^0$ in the formula (1) is an ethyl group.

The weight-average molecular weight of the hyper-branched polymer of the present embodiment is in a range of 1,000 to 1,000,000. Further, it is preferred that the number-average molecular weight of the hyper-branched polymer of the present embodiment is in a range of 3,000 to 30,000 and that the weight-average molecular weight is in a range of 10,000 to 300,000; it is more preferred that the number-average molecular weight of the hyper-branched polymer of the present embodiment is in a range of 5,000 to 30,000 and that the weight-average molecular weight is in a range of 14,000 to 200,000. In a case that the number-average molecular weight or the weight-average molecular weight is smaller than the above-described range, there is such a fear that the hyper-branched polymer might be dissolved in water. On the other hand, in a case that the number-average molecular weight or the weight-average molecular weight is greater than the above-described range, there is such a fear that the hyper-branched polymer might have a lowered solubility in the solvent, and that it might be difficult to use the hyper-branched polymer as the metal recovery agent or the catalytic activity inhibitor. Note that the weight-average molecular weight and the number-average molecular weight of the hyper-branched polymer are measured, for example, by polystyrene conversion with the gel-permeation chromatography (GPC).

A method of synthetizing the hyper-branched polymer of the present embodiment is not particularly limited; it is allowable to synthetize the hyper-branched polymer of the present embodiment by any method. For example, it is allowable to synthetize the hyper-branched polymer of the present embodiment, by using a commercially available hyper-branched polymer as the starter. Alternatively, it is allowable to synthetize the hyper-branched polymer of the present embodiment by performing synthesis of monomer, polymerization of the monomer, modification of terminal group, etc., in a sequential manner. Note that each of the weight-average molecular weight, the number-average molecular weight of the hyper-branched polymer of the present embodiment and the "m1" and "n1" in the formula (1) can be adjusted to fall within a predetermined range by adjusting the ratio of a reagent which is used in the synthesis, the condition of synthesis, etc., by any method.

The application or usage of the hyper-branched polymer of the present embodiment is not particularly limited. The hyper-branched polymer of the present embodiment is used suitably, for example, as: a metal-trapping agent, multi-functional crosslinking agent, dispersant or coating agent for metal or metal oxide, paint, ink, adhesive, resin filler, variety of kinds of molding material, nanometer-sized porous forming agent (void-forming agent), chemical-mechanical abrasive, supporting material for functional substance, nanocapsule, photonic crystal, resist material, optical material, electronic material, information recording material, printing material, battery material, biomedical material, magnetic material, intermediate, etc.

In particular, the hyper-branched polymer of the present embodiment is usable as a metal recovery agent which uses function thereof for trapping metal, and which recovers a metal in a liquid in which the metal is dissolved. For example, it is allowable to practice a method for recovering metal (metal recovering method) as follows: namely, at first, a solution of a hyper-branched polymer is prepared by dissolving the hyper-branched polymer in a solvent; next, the solution of the hyper-branched polymer is applied onto a substrate so as to form a hyper-branched polymer layer; and then, the liquid in which the metal is dissolved is caused to make contact with the hyper-branched polymer layer to thereby make the metal (metal ion) in the liquid to adsorb to the hyper-branched polymer layer and to recover the metal. In a case that a porous body or fiber having a large surface area is selected as the substrate, a contact area in which the liquid having the metal dissolved therein and the metal recovery agent (hyper-branched polymer) make contact with each other is great, thereby improving the metal recovering efficiency. The liquid in which the metal is dissolved and the metal are not particular limited. The liquid in which the metal is dissolved is exemplified, for example, by: sea water, waste liquid, sludge, sewer water, etc.; the metal is exemplified, for example, by: a noble metal such as Pd, Pt, Ag, Au, etc.; Co, Ti, Nb, V and a rare-earth element, etc. In a case that the metal made to adsorb to the hyper-branched polymer layer and thus recovered is, for example, a rare metal, etc., and that the purpose of metal recovery is re-use, the hyper-branched polymer layer to which the metal is adsorbed may be burned, etc., together with the substrate, such that the hyper-branched polymer layer (and the substrate) is removed to thereby take out the metal. Alternatively, in a case that the recovered metal is a poisonous metal, the hyper-branched polymer layer to which the metal is adsorbed may be discarded, together with the substrate.

Further, similarly to the metal recovery agent, the hyper-branched polymer of the present embodiment is usable as a catalytic activity inhibitor which uses function thereof for trapping metal, and which inhibits the catalytic activity of an electroless plating catalyst. For example, in a case that an electroless plating film is to be formed on a surface of a substrate only at a part thereof, the hyper-branched polymer solution is applied onto another part, of the surface of the substrate, in which any electroless plating film is not to be formed, such that the hyper-branched polymer layer is formed on the another part. Afterwards, a catalyst solution for electroless plating and an electroless plating solution are made to contact with the substrate formed with the hyper-branched polymer layer, thereby making it possible to form the electroless plating film only at a part in which the hyper-branched polymer layer is not formed. Although the reason for this is not clear, it is presumed as follows: namely, the hyper-branched polymer on the substrate firmly traps the electroless plating catalyst (such as Pd, etc.), in the catalyst solution for electroless plating, in a state that the electroless plating catalyst (such as Pd, etc.) is a metal ion; thus, the metal ion is not capable of being reduced to be metal of which oxidation number is 0 (zero); and since the electroless plating catalyst while remaining as the metal ion (such as Pd ion, etc.) does not exhibit the electroless catalytic activity, the electroless plating film is not formed on the hyper-branched polymer layer. Note that this mechanism is a mere presumption, and the present embodiment is not limited to or restricted by this presumption.

As described above, the present teaching provides a novel hyper-branched polymer which has a high metal-trapping capacity or performance and which is usable as a metal recovery agent, a catalytic activity inhibitor, etc.

EXAMPLES

In the following, the present teaching will be specifically explained with reference to Examples and Comparative Examples. However, the present teaching is not limited to or restricted by Examples and Comparative Examples described below.

Example 1

<Synthetization of Polymer A1>

A group having an amide group was introduced to a commercially available hyper-branched polymer (Polymer D) represented by a formula (6), and thus Polymer A1 represented by a formula (5) was synthetized. Polymer A1 represented by the formula (5) is a polymer represented by the formula (1); in the formula (1), $A^1$ is a group represented by the formula (2); $A^2$ is a group represented by the formula (3), $R^1$ is a single bond, $R^2$ is hydrogen, $R^3$ is an isopropyl group; $A^3$ is a dithiocarbamate group represented by the formula (4), $R^4$ and $R^5$ are each an ethyl group, and $R^0$ is a vinyl group or ethyl group.

At first, the hyper-branched polymer represented by the formula (6) (Polymer D: produced by NISSAN CHEMICAL CORPORATION under a trade name of "HYPERTECH HPS-200"; 1.3 g, dithiocarbamate group: 4.9 mmol), N-isopropyl acrylamide (NIPAM)(1.10 g, 9.8 mmol), α-α'-azo-bisisobutyronitrile (AIBN)(81 mg, 0.49 mmol), and dehydrated tetrahydrofuran (THF) (10 mL) were added to a Schlenk flask, followed by being subject to freeze-deaeration three times. Afterwards, an oil bath was used to agitate and subject the mixture inside the Schlenk flask to reaction at 70° C. for one night (18 hours). After the completion of the reaction, the mixture was cooled with iced water, and was diluted appropriately by THF. Next, the mixture was subjected to re-precipitation in hexane; a solid product obtained thereby was subjected to vacuum drying at 60° C. for one night. The dried solid product was further dissolved by THF, was subjected to re-precipitation in water, and thus a solid product was obtained. The obtained solid product was subjected to vacuum drying at 60° C. for one night, and thus a generated product was obtained. The yield of the generated product was 69%.

Figure 2:
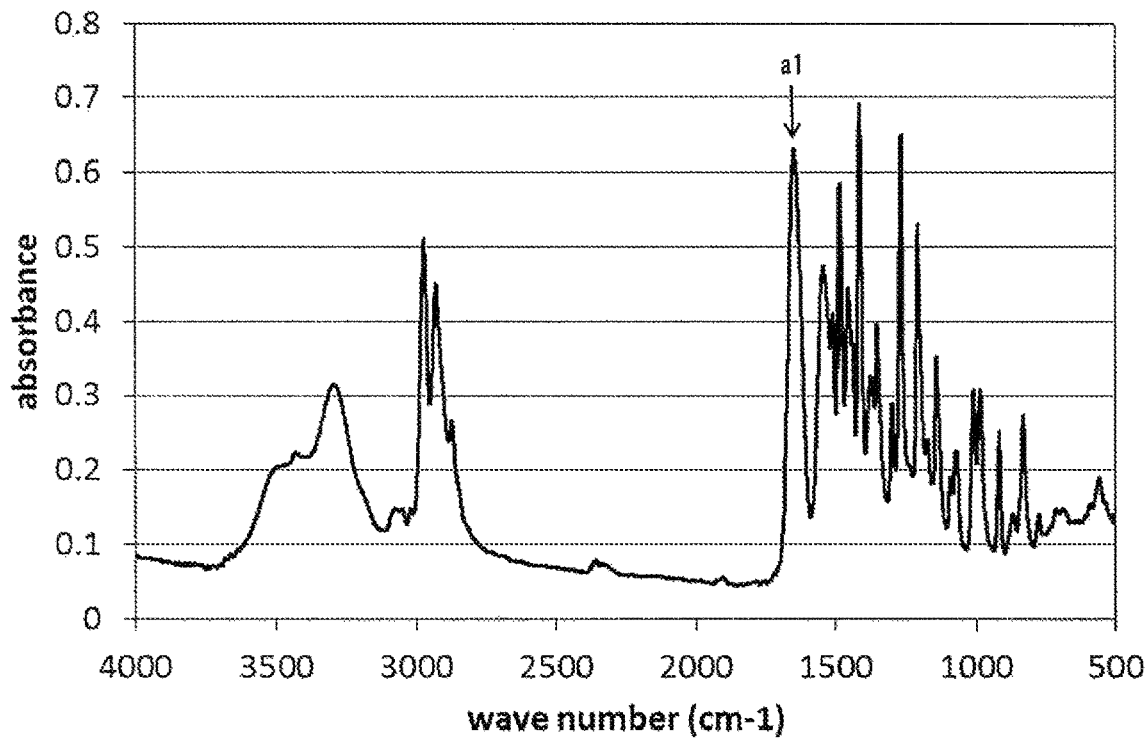
FIG. 2 is an IR spectrum of a hyper-branched polymer A1 synthesized in Example 1.

The $^1$H-NMR (Nuclear Magnetic Resonance) and IR (InfraRed absorption spectrum) of the generated product were measured. From the results of the measurements, it was confirmed that the amide groups were introduced into the commercially available hyper-branched polymer represented by the formula (6) (Polymer D), which in turn generated Polymer A1 represented by the formula (5). In the IR spectrum of Polymer A1 indicated in FIG. 2, Absorption al originating from the amide group (in the vicinity of 1600 cm$^{-1}$ to 1700 cm$^{-1}$) appeared. Further, based on Peak 1 (4.0 ppm) and Peak 2 (3.7 ppm) of the $^1$H-NMR spectrum of Polymer A1 indicated in FIG. 3, the ratio (molar ratio: N/S) of the total molar number of the amide group contained in $A^2$ to the molar number of $A^3$ which is the group containing sulfur was calculated by the following expression. The molar ratio (N/S) was 0.96.

$(N/S)=(I_{P1}-I_{P2})/(I_{P2}/2)$ $I_{P1}$: peak area of Peak 1
$I_{P2}$: peak area of Peak 2

Figure 3:
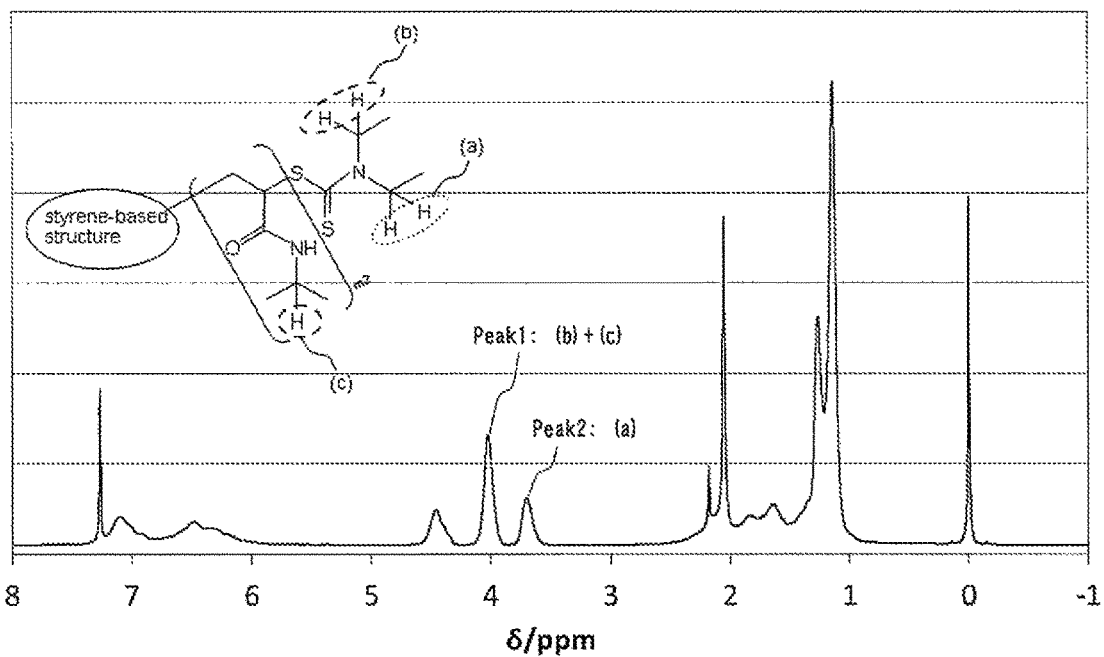
FIG. 3 is a $^1$H-NMR spectrum of the hyper-branched polymer A1 synthesized in Example 1.

FIG. 3 also depicts a schematic view of the structure of Polymer A1. Peak 1 is a peak originating from 2 pieces of hydrogen (b) in the group ($A^3$) containing the sulfur and 1 piece of hydrogen (c) in the group ($A^2$) containing the amide group in the terminal group of Polymer A1; and Peak 2 is a peak originating from 2 pieces of hydrogen (a) in the group ($A^3$) containing the sulfur in the terminal group of Polymer A1.

Next, the molecular weight of the generated product was measured by the GPC (gel-permeation chromatography). The molecular weight was: number-average molecular weight (Mn)=9,946 and weight-average molecular weight (Mw)=24,792, which is unique to the hyper-branched structure wherein the value of the number-average molecular weight (Mn) and the value of weight-average molecular weight (Mw) are greatly different from each other.

[Polymer A1]

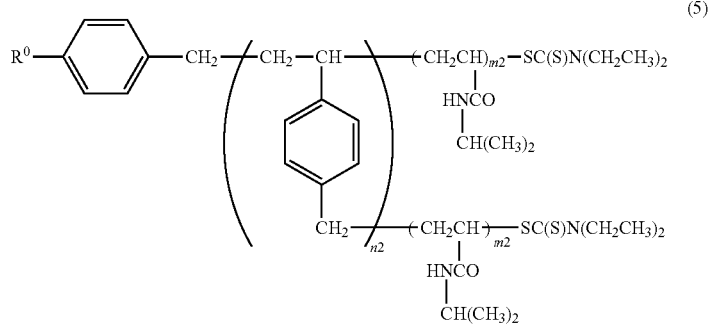

(5)

[Polymer D]

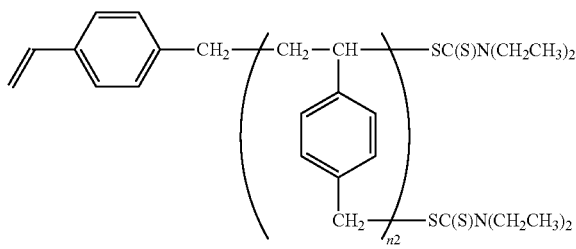

(6)

Example 2

<Synthetization of Polymer A2>

Polymer A2 was synthetized in a similar manner to that in Example 1, except that the amount of NIPAM was made to be 2.20 g and that the reaction time was made to be 24 hours. The $^1$H-NMR measurement, the IR measurement, and the measurement of the molecular weight were performed for the generated product (Polymer A2), in a similar manner to that in Example 1. From the results of the measurements, it was confirmed that Polymer A2 was a hyper-branched polymer represented by the formula (5), similarly to Polymer A1. Further, the molar ratio (N/S) was 1.22; the number-average molecular weight (Mn)=10,700 and the weight-average molecular weight (Mw)=25,200.

Example 3

<Synthetization of Polymer A3>

Polymer A3 was synthetized in a similar manner to that in Example 1, except that the reaction time was made to be 8 hours. The $^1$H-NMR measurement, the IR measurement, and the measurement of the molecular weight were performed for the generated product (Polymer A3), in a similar manner to that in Example 1. From the results of the measurements, it was confirmed that Polymer A3 was a hyper-branched polymer represented by the formula (5), similarly to Polymer A1. Further, the molar ratio (N/S) was 0.78; the number-average molecular weight (Mn)=9,400 and the weight-average molecular weight (Mw)=24,000.

[Evaluation]

Polymers A1 to A3 synthetized in Examples 1 to 3, respectively, were subjected to evaluation as described below.

(1) Evaluation of Solubility

Polymers A1 to A3 were added to four kinds of solvents as indicated in TABLE 1 such that the concentration of each of Polymers A1 to A3 was 2% by weight, and test was performed as to whether each of Polymers A1 to A3 was dissolved in the solvents. The test was performed at a room temperature. The results of test is indicated in TABLE 1.

TABLE 1

| | Polymer A1 | Polymer A2 | Polymer A3 |
|---|---|---|---|
| Molar Ratio (N/S) | 0.96 | 1.22 | 0.78 |
| Tetrahydrofuran | + | + | + |
| Methylethylketone | + | + | + |
| Cyclohexanone | + | + | + |
| Toluene | + | + | + |

In TABLE 1, "+" indicates "dissolved".

Each of Polymers A1 to A3 was dissolved in the general-purpose solvents which were tetrahydrofuran (THF), methylethylketone (MEK), cyclohexanone and toluene.

(2) Evaluation 1 of Metal-Trapping Performance

A substrate formed with a hyper-branched polymer layer was subjected to application of an electroless plating catalyst (Pd) and a electroless plating treatment, and an evaluation was made regarding the metal-trapping performance of the hyper-branched polymer. In a case that the metal-trapping performance of the hyper-branched polymer is high, the hyper-branched polymer firmly adsorbs (traps) a large number of the electroless plating catalyst thereto, thereby making it difficult for the electroless plating reaction to occur. On the other hand, in a case that the metal-trapping performance of the hyper-branched polymer is low, the number of the electroless plating catalyst adsorbed to the hyper-branched polymer is small, and the adsorption is not strong or firm as well, thereby making it easy for the electroless plating reaction to occur. As described above, the plating reactivity on the hyper-branched polymer layer is determined by the metal-trapping performance of the hyper-branched polymer. In this evaluation, the hyper-branched polymer was used as the catalytic activity inhibitor, and a polymer which is highly effective as the catalytic activity inhibitor was evaluated as having a high metal-trapping performance. For a comparison purpose, this evaluation was also performed for Polymer D, in addition to Polymers A1 to A3.

<Evaluation Method>

Polymer A1 was dissolved in toluene, and a polymer solution having a polymer concentration of 0.5% by weight was prepared. The solution of Polymer A1 was dip-coated on a resin substrate (polyamide, produced by TOYOBO CO., LTD., under a trade name of "VYLOAMIDE"), and was subjected to drying, and thus a polymer layer of Polymer A1 was formed. In a similar method, Polymers A2, A3 and D were used and thus polymer layers of Polymer A2, A3 and D were each formed on the resin substrate.

Next, a commercially available catalyst solution for electroless plating was used, and the electroless plating catalyst was applied, by a method described below, to the resin substrate formed with the polymer layer. At first, the resin substrate was immersed in a sensitivity imparting agent (produced by OKUNO CHEMICAL INDUSTRIES CO., LTD., under a trade name of "SENSITIZER") at normal temperature (room temperature) and was irradiated with ultrasonic waves for 5 minutes to thereby perform a sensitizing processing; and thus tin colloid was made to adsorb onto the surface of the resin substrate. Afterwards, the resin substrate was taken out from the sensitivity imparting agent, and was washed by water sufficiently. Next, the resin substrate was immersed in a catalyzing treatment agent (produced by OKUNO CHEMICAL INDUSTRIES CO., LTD., under a trade name of "ACTIVATOR") at normal temperature (room temperature), was left to stand for 2 minutes, and thus was subjected to an activator processing so that Pd was made to adsorb onto the surface of the resin substrate. Afterwards, the resin substrate was taken out from the catalyzing treatment agent, and was washed by water sufficiently.

The resin substrate having the electroless plating catalyst applied thereto was immersed in an electroless copper plating solution (produced by OKUNO CHEMICAL INDUSTRIES CO., LTD., under a trade name of "OPC-NCA") at 61° C. for 15 minutes.

Then, evaluation was made as to whether or not an electroless copper plating film was grown.

The metal-trapping performance of each of Polymers A1 to A3 and D was evaluated in accordance with the following criterion for evaluation. The results of the evaluation are indicated in TABLE 2.

<Criterion for Evaluation of Metal-Trapping Performance>

+: The electroless plating film was not grown. Thus, the polymer has a high metal-trapping performance.

−: The electroless plating film was grown. Thus, the polymer has a low metal-trapping performance.

TABLE 2

| Polymer | Molar Ratio (N/S) | Metal-Trapping Performance |
|---|---|---|
| A1 | 0.96 | + |
| A2 | 1.22 | + |
| A3 | 0.78 | + |
| D | 0 | − |

As indicated in TABLE 2, Polymers A1 to A3 had high metal-trapping performance. On the other hand, Polymer D containing no amide group in the terminal group ((N/S)=0) had low metal-trapping performance. The reason for this is presumed that since Polymer D does not have, in the terminal group thereof, the amide group interacting the metal and thus is not capable of trapping the metal.

(3) Evaluation 2 of Metal-Trapping Performance

A substrate formed with a hyper-branched polymer layer was immersed in a liquid in which a metal was dissolved so as to recover the metal, and the metal-trapping performance of the hyper-branched polymer was evaluated. Namely, this evaluation used the hyper-branched polymer as a metal recovery agent.

<Evaluation Method>

Firstly, three kinds of solutions were prepared, each as the liquid in which the metal is dissolved. The metal concentration in each of the liquids was 150 ppm.

Pd solution: commercially available Pd aqueous solution (produced by OKUNO CHEMICAL INDUSTRIES, Co., Ltd., under a product name of "ACTIVATOR")

Pt solution: aqueous solution of potassium tetrachloroplatinate (II)

Ag solution: aqueous solution of silver nitrate

Polymer A1 was used so as to produce a resin substrate having a polymer layer, in a similar method to that in (2) Evaluation 1 of the metal-trapping performance as described above. Further, for the comparison, a resin substrate not having the polymer layer was also prepared. The resin substrate having the polymer layer and the resin substrate having no polymer layer were each immersed in the Pd solution for 5 minutes, subjected to the washing with water and the drying. Similarly, the resin substrate having the polymer layer and the resin substrate having no polymer layer were each immersed also in the Pt solution and in the Ag solution, subjected to the washing with water and the drying.

The surface of each of the resin substrates immersed in one of the solutions was subjected to the XPS (X-ray Photoelectron Spectroscopy) analysis. With respect to the resin substrate immersed in the Pd solution, Pd was quantitively determined; with respect to the resin substrate immersed in the Pt solution, Pt was quantitively determined; and with respect to the resin substrate immersed in the Ag solution, Ag was quantitively determined. The results of the evaluation are indicated in TABLE 3.

TABLE 3

| | Resin Substrate | | |
|---|---|---|---|
| | Pd (at %) | Pt (at %) | Ag (at %) |
| Without Polymer Layer | 0.9 | 0.7 | 0.7 |
| With Polymer Layer | 1.6 | 1.4 | 1.7 |

As indicated in TABLE 3, with respect to all the Pd, Pt and Ag, the resin substrate having the polymer layer was capable of recovering the metal in a greater amount (quantity) than the resin substrate not having the polymer layer. From this result, it is confirmed that Polymer A1 had a capability of trapping Pd, Pt and Ag which are the metal.

The novel hyper-branched polymer of the present teaching had the metal-trapping performance. Accordingly, the hyper-branched polymer of the present teaching is usable, for example, as the metal recovery agent recovering a metal in a liquid in which the metal is dissolved, and the catalytic activity inhibitor inhibiting catalytic activity of an electroless plating catalyst.

What is claimed is:

1. A hyper-branched polymer represented by the following formula (1) and having a weight-average molecular weight in a range of 1,000 to 1,000,000:

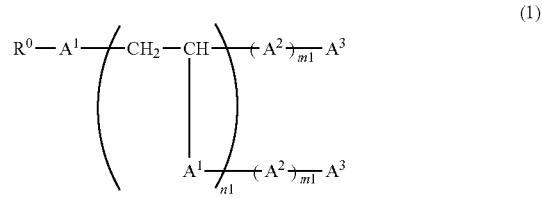

wherein in the formula (1), $A^1$ is a group containing an aromatic ring, $A^2$ is a group containing an amide group, $A^3$ is a group containing sulfur, $R^0$ is hydrogen or a substituted or unsubstituted hydrocarbon group having 1 to 10 carbon atoms, m1 is in a range of 0.5 to 11, and n1 is in a range of 5 to 100.

2. The hyper-branched polymer according to claim 1, wherein in the formula (1), $A^1$ is a group represented by the following formula (2), and $A^3$ is a dithiocarbamate group.

3. The hyper-branched polymer according to claim 1, wherein in the formula (1), $A^2$ is a group represented by the following formula (3):

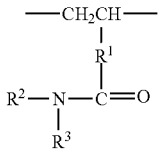

in the formula (3), $R^1$ is a single bond or a substituted or unsubstituted alkylene group having 1 to 5 carbon atoms, and $R^2$ and $R^3$ are each hydrogen or a substituted or unsubstituted alkyl group having 1 to 10 carbon atoms.

4. The hyper-branched polymer according to claim 3, wherein in the formula (3), $R^1$ is the single bond, $R^2$ is the hydrogen, and $R^3$ is an isopropyl group.

5. The hyper-branched polymer according to claim 1, wherein in the formula (1), $A^3$ is a group represented by the following formula (4):

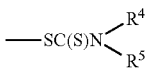

in the formula (4), $R^4$ and $R^5$ are each hydrogen or a substituted or unsubstituted alkyl group having 1 to 5 carbon atoms.

6. The hyper-branched polymer according to claim 5, wherein in the formula (4), $R^4$ and $R^5$ are each an ethyl group.

7. The hyper-branched polymer according to claim 1, wherein in the formula (1), a ratio of a total molar number of the amide group contained in $A^2$ to a molar number of $A^3$ which is the group containing sulfur is in a range of not less than 0.5 to less than 1.5.

8. The hyper-branched polymer according to claim 1, wherein in the formula (1), $A^3$ is a dithiocarbamate group; and
   a ratio of a total molar number of the amide group contained in $A^2$ to a molar number of $A^3$ which is the group containing sulfur is in a range of 0.5 to 1.5.

9. The hyper-branched polymer according to claim 1, wherein in the formula (1), $R^0$ is a vinyl group.

10. The hyper-branched polymer according to claim 1, wherein the hyper-branched polymer is a mixture of a hyper-branched polymer in which the $R^0$ in the formula (1) is a vinyl group and a hyper-branched polymer in which the $R^0$ in the formula (1) is an ethyl group.

11. A metal recovery agent recovering a metal in a liquid in which the metal is dissolved, comprising the hyper-branched polymer as defined in claim 1.

12. A metal-recovering method of recovering a metal in a liquid in which the metal is dissolved, the method comprising:
    preparing a solution of a hyper-branched polymer by dissolving the hyper-branched polymer as defined in claim 1 in a solvent;
    applying the solution of the hyper-branched polymer onto a substrate so as to form a hyper-branched polymer layer; and
    causing the liquid to make contact with the hyper-branched polymer layer to thereby make the metal in the liquid to adsorb to the hyper-branched polymer layer and to recover the metal.

13. A catalytic activity inhibitor inhibiting catalytic activity of an electroless plating catalyst, the catalytic activity inhibitor comprising the hyper-branched polymer as defined in claim 1.

* * * * *